Feb. 22, 1949.  L. J. WILCOX  2,462,699
FABRICATION OF CONDUITS FOR CORROSIVE FLUIDS
Filed Dec. 29, 1944  2 Sheets-Sheet 1

Leon J. Wilcox Inventor
By P. L. Young Attorney

Feb. 22, 1949.         L. J. WILCOX         2,462,699
FABRICATION OF CONDUITS FOR CORROSIVE FLUIDS
Filed Dec. 29, 1944                2 Sheets-Sheet 2

Leon J. Wilcox Inventor
By ............ Attorney

Patented Feb. 22, 1949

2,462,699

UNITED STATES PATENT OFFICE 2,462,699

FABRICATION OF CONDUITS FOR CORROSIVE FLUIDS

Leon J. Wilcox, Westfield, N. J., assignor to Standard Oil Development Company, a corporation of Delaware Application December 29, 1944, Serial No. 570,453

1 Claim. (Cl. 22—202)

This invention relates to the fabrication of conduits for the handling of corrosive fluids, and in particular to composite conduits having a pressure-resistant casing protected by a corrosion-resistant lining.

The problem of handling corrosive fluids presents many difficulties, especially in regard to the transportation of such materials. The means proposed in the prior art for the handling of corrosive fluids have included the lining of various metal pieces of equipment with such fragile material as glass and ceramic ware. Such linings, while presumably effective throughout the length of the equipment, present difficulties in the sealing together of various parts and the necessity for careful handling to prevent cracks or other such breakages in the lining. The present invention relates to the fabrication of conduits for the transportation of corrosive fluids having a pressure-resistant casing with at least one lining which permits of easy assembly and the sealing at junction points of different pieces of the conduit material.

Figures 1, 1A, 2, 5:
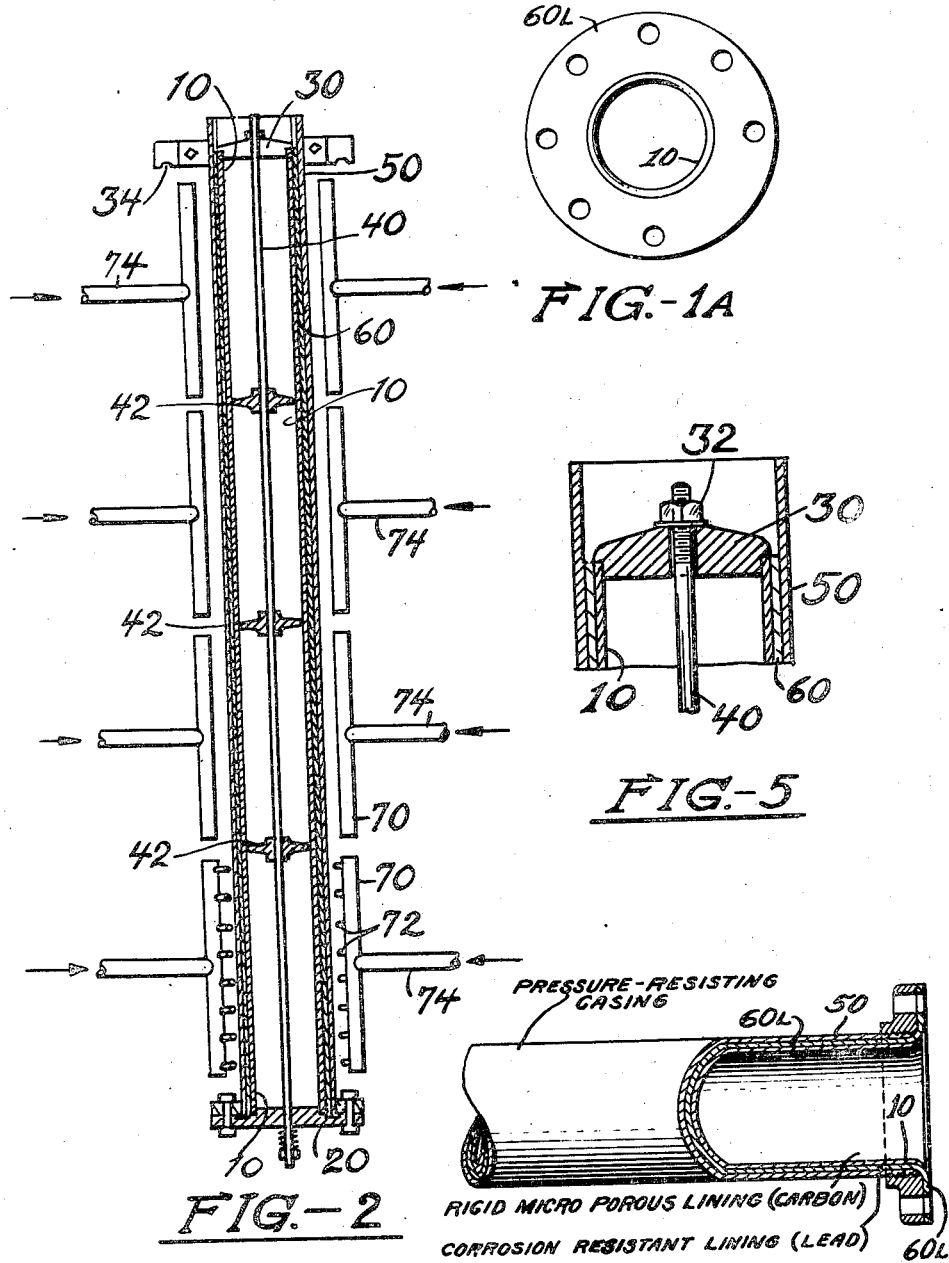

In application Serial No. 546,691, filed July 26, 1944, conduits such as illustrated in Figures 1 and 1A of the present application were proposed for the handling of corrosive fluids, consisting of a rigid, corrosion-resistant, relatively impervious lining 10 either alone or covered by lead sheathing 60L as a means of protecting an outer pressure-resistant casing 50 susceptible of corrosion. A proposed conduit consists of a rigid, corrosion-resistant, micro-porous lining such as structural carbon 10 in a pressure-resistant casing 50 such as steel with an intermediate impervious, corrosion-resistant lining of lead 60L. The fabrication of such a conduit was proposed as being effected by the pushing in of the corrosion-resistant lining into the outer pressure-resistant casing, or the clamping of the pressure-resistant casing upon the corrosion protective material. The present invention relates to an improved method of fabrication of such a composite conduit.

In general, the essentially corrosion-resistant intermediate linings proposed in application Serial No. 546,691 are of the type that under certain conditions are available in the liquid state. Thus, lead, which is often used, is easily available in the molten state. Similarly, corrosion-resistant procelain may be conveniently prepared by the setting of a suitable composition from a liquid state. It is the basis of the present invention that the essentially corrosion-resistant intermediate lining in the conduits proposed in application Serial No. 546,691 be poured into the annular space formed by the suitable placing of the inner, relatively impervious lining material into the pressure-resistant casing.

In order that the invention may be more fully understood, specific illustration will be presented in regard to the fabrication of a composite conduit formed from a pressure-resistant casing of steel, an intermediate corrosion-resistant lining of lead and the innermost relatively impervious lining material of structural carbon. The method of fabrication will be described in conjunction with the attached drawings, Figs. 2 to 5.

In Fig. 2, illustration is presented of the method of fabricating the composite conduit and the means for heating the outer casing by gas jets during the fabrication.

Figure 3:
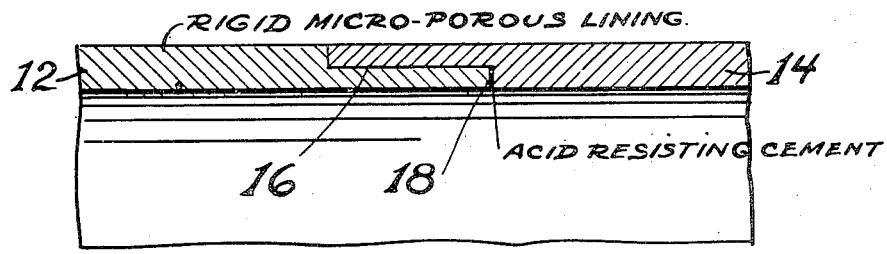

Fig. 3 illustrates the method of joining pieces of the relatively impervious innermost lining.

Figure 4:
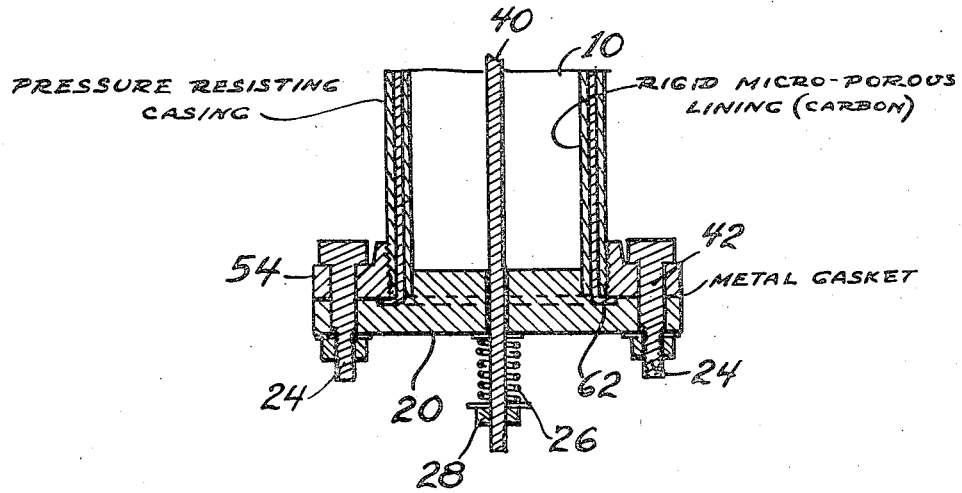

Fig. 4 presents details of the lower clamping means for holding the micro-porous tubing in place during the fabrication of the conduit and shows that the annular space between the outer casing and inner lining at the bottom has a continuation adapted for the forming of a flange face.

Fig. 5 shows the upper clamping means for holding the micro-porous lining in place during the fabrication. Corresponding numerals are used in all the drawings.

In Fig. 2, there is shown the inner relatively impervious tube lining 10 held in place by the lower clamping means 20 and the upper clamping means 30 which also center the spider structural piece 40 with spider elements 42. The upper and lower clamping devices also hold in place the outer pressure-resistant casing 50 so that between the relatively impervious tubing 10 and the casing material 50 there is a concentric annular space 60. External to the pressure casing 50 is shown a series of gas jet assemblies 70 with individual jets 72 and gas connection 74.

Fig. 3 shows in detail the method by which the various pieces of the relatively impervious innermost lining are joined together. It shows pieces 12 and 14 machined so as to permit a stepwise joint 16. The joint is sealed by means of acid-resisting cement 18 in the part of the joint exposed to the inside of the pipe. This acid-resisting cement thus also serves to prevent the penetration of the corrosive fluid through the joint while the pipe is in service. The lower clamping means 20 for the inner relatively impervious lining material and the outer pressure-resistant casing is shown in detail in Fig. 4 as comprising a mold against which both cylindrical pieces are tightly held so as to allow an annular space between.

Fig. 4 shows that below the end of the outer pressure casing 50 the annular space has a continuation 62 in L-shaped fashion to provide for the formation of a flange face. The lower portion of the special flange mold 20 is bolted to a flange 54 upon the outer casing 50 by means of the nut and bolt combinations 24. The centering rod or spider assembly 40 is also held in position by passage through the mold and is held tight by means of the spring 26 maintained under tension by means of the nut 28.

In Fig. 5, the upper portion of the centering rod 40 is shown as being held in place and in a concentric position by means of the nut 32 upon the uppermost part of the rod. Also, the annular space 60 is shown between the inner piping 10 and the outer casing 50. The inner lining 10 is shown as having shoulder relationship with a portion of the upper clamping means 30.

The particular method of fabricating the composite conduit with this assembly is to have the inner rigid, relatively impervious liner 10 secured in place by means of the lower clamp 20 and the spider structure 40 within the outer pressure casing 50 so that between the two an annular cylindrical space remains which terminates in an L-shaped space 62 at the lower flange 20. An external clamping device 34 with integral supporting lugs is used to suspend the entire assembly. Into the thus suspended assembly, the intermediate corrosion-resistant lining material—molten lead in this particular instance—is poured. Before the pouring of the lead it is essential to insure adherence of the lead to the inner surface of the outer casing and that the inner suface of the casing be carefully cleaned, pickled, and tinned. The subsequent solidification of the lead is allowed to occur under controlled conditions by regulation of the gas supply to the jet assemblies. The gas jet assemblies are so arranged that the various jets may be turned off progressively from the bottom of the assembly to the top during the period of solidification of the lead. Often times, it is more convenient to control the heating by means of electrical heaters instead of the gas heaters as shown in the illustration. With the assembly thus prepared, the molten lead is poured from the top into the annular space between the outer casing and the inner rigid microporous lining. After the lead has been poured to completely fill the annular space, the gas jets or electric heaters are turned off progressively from the bottom to the top to allow the lead to solidify. During this solidification period, such additional quantity of lead as may be necessary to compensate for shrinkage is added at the top.

After solidification, the bottom flange mold, centering rod, clamps, spiders, etc., are stripped from the pipe structure and sufficient of the pipe assembly is cropped from the top to insure removal of all dross. The cropped end of the pipe is then threaded and a pipe flange attached. The face of this flange is then covered with a layer of lead either by casting, lead burning or by bonding thereto a disc of sheet lead. This facing is burned to the concentric exposed end of the lead lining, thus covering all steel parts which might be exposed to the action of the corrosive fluid passing through the joined parts. The face of the bottom flange is protected in a similar way by joining additional lead to that which has solidified in the mold in the L-shaped portion 62. Before bonding lead to these flanges, it is necessary that they be cleaned, pickled and tinned. The ends of the carbon lining are cemented to the lead lining with an acid-resisting cement in such a way as to cover as much of the lead as possible and to preclude the entrance of the corrosive fluid between the flanges when the lengths of the conduit are bolted together.

In the above illustration, fabrication of a conduit with regard to lead being the intermediate lining is presented. It is contemplated that other corrosion-resisting materials such as porcelain might also be used. In such a case, the material would be poured into the annular space in a liquid form and allowed to solidify either with or without the assistance of heat as may be required. Also, in the event that a rigid conduit is required in which porcelain alone is satisfactory as a protective medium against corrosion, two layers of porcelain may be used in order to avoid costly machining or other fitting. In such a case, a rigid pipe of porcelain would be used in essentially the same manner as described in the specific illustration for carbon, leaving between itself and the outer casing an annular space into which a liquid porcelain would be poured and allowed to solidify.

What is claimed is:

The method of fabricating conduits for corrosive fluids consisting of an outer pressure-resistant casing of steel, and a rigid inner liner of a corrosion-resistant, microporous carbon material separated from and bonded to said casing by a poured lead interliner, which comprises supporting the rigid liner concentrically of the casing, and in spaced relation thereto, by means of a mold element attached to the lower end of the casing in spaced relation thereto, said mould element and liner forming with the casing an annular chamber having an outwardly extended annularly flanged portion overlapping the lower end of the casing, pouring molten lead into said chamber from the upper end thereof to completely fill the chamber, cooling the molten lead under controlled conditions of solidification, adding molten lead to the chamber to supply any shrinkage deficiency, cropping the upper end of the conudit to remove dross in the interliner, and facing the upper end of the cropped casing with lead thermally united to the cropped end of the lead interliner.

LEON J. WILCOX.

REFERENCES CITED

The following references are of record in the file of this patent:

UNITED STATES PATENTS

| Number | Name | Date |
| --- | --- | --- |
| 1,590,392 | Peters | June 29, 1926 |
| 1,748,851 | Smith | Feb. 25, 1930 |

FOREIGN PATENTS

| Number | Country | Date |
| --- | --- | --- |
| 543,045 | Germany | Feb. 3, 1932 |